(12) United States Patent
Skärby

(10) Patent No.: US 9,066,364 B2
(45) Date of Patent: Jun. 23, 2015

(54) METHOD AND ARRANGEMENT FOR TRANSMISSION OF DATA PACKETS

(75) Inventor: Christian Skärby, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 302 days.

(21) Appl. No.: 13/639,649

(22) PCT Filed: Apr. 21, 2011

(86) PCT No.: PCT/SE2011/050491
§ 371 (c)(1),
(2), (4) Date: Oct. 31, 2012

(87) PCT Pub. No.: WO2011/133103
PCT Pub. Date: Oct. 27, 2011

(65) Prior Publication Data
US 2013/0051359 A1 Feb. 28, 2013

Related U.S. Application Data

(60) Provisional application No. 61/326,925, filed on Apr. 22, 2010.

(30) Foreign Application Priority Data

Apr. 22, 2010 (EP) .................................. 10160784

(51) Int. Cl.
*H04B 7/204* (2006.01)
*H04W 72/12* (2009.01)

(52) U.S. Cl.
CPC ...... *H04W 72/1226* (2013.01); *H04W 72/1205* (2013.01)

(58) Field of Classification Search
CPC ................... H04W 72/1226; H04W 72/1205; H04W 84/12; H04W 88/08; H04W 80/04; H04W 88/06; H04W 84/18; H04W 8/26; H04L 2012/5608; H04B 7/2045; H04B 7/208; H04B 7/2621

USPC .................. 370/310.2, 319, 328, 344, 349
See application file for complete search history.

(56) References Cited

U.S. PATENT DOCUMENTS 5,999,819 A * 12/1999 Khanna et al. ................. 455/450
2003/0078051 A1 * 4/2003 Fattouch ....................... 455/452
(Continued)

FOREIGN PATENT DOCUMENTS

EP 0713300 A1 5/1996
EP 1296463 A1 3/2003
(Continued)

OTHER PUBLICATIONS

Castañeda, Mario et al., "Outdated Uplink Adaptation due to Changes in the Scheduling Decisions in Interfering Cells", IEEE 2008, 1-5.

(Continued)

*Primary Examiner* — Brenda H Pham
(74) *Attorney, Agent, or Firm* — Murphy, Bilak & Homiller, PLLC

(57) ABSTRACT

The invention relates to a method and arrangement for improving predictability of inter-cell interference in wireless communication systems. A first network radio entity (104, 116) receives (1002) data and estimates (1004) an amount of frequency resources needed to transmit the data. A resource limitation condition is determined (1006) and applied when scheduling (1008) the data for transmission. The resource limitation condition prolongs a time needed to transmit the data by at least one transmission time interval as compared to the time needed to transmit the data using a maximum amount of frequency resources available per scheduling occasion. The data is scheduled within a scheduling time interval that depends on the resource limitation condition and on the estimated amount of frequency resources and that extends over at least two scheduling occasions, and then transmitted (1010) by the first network radio entity (104, 116) on the estimated amount of frequency resources.

19 Claims, 10 Drawing Sheets

(56) References Cited

U.S. PATENT DOCUMENTS

2004/0170179 A1 9/2004 Johansson et al.
2009/0270109 A1 10/2009 Wang Helmersson et al.

FOREIGN PATENT DOCUMENTS

| EP | 2056642 A2 | 5/2009 |
|---|---|---|
| WO | 9943105 A1 | 8/1999 |
| WO | 03101134 A1 | 12/2003 |
| WO | 2007001145 A1 | 1/2007 |
| WO | 2008/130297 A1 | 10/2008 |
| WO | 2008118051 A1 | 10/2008 |
| WO | 2009099361 A1 | 8/2009 |

OTHER PUBLICATIONS

Feng, et al., "Uplink Adaptive Resource Allocation Mitigating Intercell Interference Fluctuation for Future Cellular Systems", IEEE 2007, 1-6.

Fodor, et al., "A Low Intercell Interference Variation Scheduler for OFDMA Networks", IEEE 2008, 1-7.

Fodor, et al., "On the Impact of Uplink Scheduling on Intercell Interference Variation in MIMO OFDM Systems", IEEE 2009, 1-6.

Ofuji, et al., "Group-Wised Reference Signal Allocation for Single-Carrier FDMA Radio Access in Evolved UTRA Uplink", IEEE 2007, 1-5.

* cited by examiner

METHOD AND ARRANGEMENT FOR TRANSMISSION OF DATA PACKETS

TECHNICAL FIELD

The invention relates to a method and an arrangement in a network radio entity, in particular it relates to improving predictability of inter-cell interference in wireless communication systems.

BACKGROUND

Cellular technologies of today aimed to provide mobile broadband, such as LTE and WiMAX, employ dynamic scheduling of radio resources in frequency as well as in time, in order to achieve efficient utilization of the available resources. With a certain periodicity, typically in the order of 1 ms, a scheduling occasion occurs in a sending radio entity, in which a packet scheduler makes a decision to allocate resources, e.g. in order to transmit a packet to a user terminal. Since a transmission in one cell typically generates interference in a neighboring cell, referred to as inter-cell interference, the dynamic scheduling generates a dynamic interference situation in the network, resulting in radio link quality variations in radio communication.

To compensate for the varying quality of the radio interface, the scheduler employs link adaptation (LA). If the quality is low, link adaptation will adjust the transmission rate, typically by selecting a more robust modulation and/or coding scheme, in order to ensure that the receiver is able to decode the transmission.

How well the link adaptation works depends on how well the scheduler can predict what the quality of the link will be during the transmission. If the link quality is overestimated, the receiver may not be able to decode the transmission and retransmissions become necessary, resulting in increased delay and lower throughput as a consequence. On the other hand, if the link quality is underestimated, the scheduler will select a too robust modulation and coding scheme and transmission will be made at a lower rate than needed.

Since the inter-cell interference has a substantial negative effect on channel quality, it is beneficial if the scheduler can predict the interference generated by neighbouring cells. Furthermore, the interference in many scenarios, i.e. so-called "interference limited" scenarios, puts a limit on how far from the base station antenna transmissions can be made. In order to manage these interference limited scenarios properly, Inter Cell Interference Coordination (ICIC) schemes are often employed. In such schemes, the scheduler, e.g. in a base station in a cell, usually notifies network nodes in the neighbouring cells of in which parts of the frequency band they can expect heavy interference, so that the network nodes in the neighbouring cells can avoid allocating those parts of the spectrum to a user terminal that would otherwise suffer from the interference.

The nature of packet data transmissions generates a very unpredictable interference situation at low to medium traffic loads. Packets often arrive in bursts and are scheduled for transmission in a cell using all available radio resources of the cell during a short time. The radio interface then remains unused until another burst arrives. This creates a situation where user terminals (UEs) in neighbouring cells experience full interference on the whole frequency band during a short period of time, and then experiences no interference for a subsequent period of time. The performance, expressed as bit-rate experienced by the user terminals, in a system having such fluctuating inter-cell interference, is basically the same at 50% load as at 100% load, mainly due to the difficulty in predicting the interference.

The unpredictable interference also makes ICIC difficult. ICIC is most efficient when the frequency resources in a cell are not fully used. The on-off interference situation described above leaves very little room for coordination. Furthermore, the communication between cells is generally not fast enough to allow for coordination of each scheduling decision individually, so the scheduler must often rely on averaging schemes. One solution to this problem is, e.g., a reuse scheme, where the frequency spectrum, e.g. in cell border areas, is divided between neighbouring cells. Such a division could be of a relatively dynamic or of a more static character. However, such a scheme is generally not a very good solution, since the gain in channel quality rarely compensates for the loss in bandwidth due to the use of such a scheme.

There are examples of attempts of addressing the problem of fluctuating inter-cell interference by varying the transmission power, and/or the coding and modulation schemes in order to achieve a non-varying interference during one, or a fraction of one, transmission time interval (TTI). One such example is presented in the patent document EP 1296463 A1. However, such solutions are not applicable in e.g. LTE or WiMAX, where the generated interference, per default, is non-varying during one TTI. Further, it is not possible to vary the transmission power in radio access techniques such as LTE and WiMAX, in a similar way as in WCDMA or GSM.

Consequently, it is a problem that the above-described unpredictable inter-cell interference has a negative effect on throughput, i.e. effective data rate of the communication, radio resource utilisation and/or communication quality.

SUMMARY

It would be desirable to obtain a more predictable inter-cell interference. It is an object of the invention to address at least some of the issues outlined above. Further it is an object of the invention to provide a method and an apparatus for smoothing of the inter-cell interference experienced in a cell in a wireless communication system.

According to a first aspect of the invention this object is achieved by method in a first network radio entity 104, 116 for improving predictability of inter-cell interference in a wireless communication system. The first network radio entity 104, 116 is located in a first cell 110. The prediction of the interference is made prior to transmission of data by at least one neighbouring network radio entity 102, 114 located in a neighbouring cell 108. The interference is generated by transmission of data from the first network radio entity 104, 116 to one or more receiving network radio entities 116, 104 located in said first cell 110. In some embodiments the first network radio entity may be a base station and the one or more receiving network radio entities may be mobile terminals.

The first network radio entity 104, 116 receives an amount of data to be transmitted and estimates an amount of frequency resources needed to transmit data waiting to be transmitted, including the received amount of data. Then the first network radio entity 104, 116 determines a resource limitation condition that prolongs a time needed to transmit the data waiting to be transmitted by at least one transmission time interval (TTI) as compared to the time needed to transmit the data waiting to be transmitted using a maximum amount of frequency resources available per scheduling occasion. The resource limitation condition may for example specify a maximum amount of data to be scheduled at each scheduling occasion, or a reduced amount of frequency resources available at one scheduling occasion, as compared to a maximum amount of frequency resources available per scheduling occasion or a period in time to be used as a scheduling time interval.

The first network radio entity 104, 116 then schedules the data waiting to be transmitted. At the scheduling, the resource limitation condition is applied so that the data waiting to be transmitted is scheduled for transmission in scheduling occasions within the scheduling time interval. This interval extends over at least two scheduling occasions and depends on the resource limitation condition and on the estimated amount of frequency resources.

According to some embodiments the scheduling time interval may be selected so that it is shorter than a respective delay budget of packets comprising the data waiting to be transmitted, while fulfilling the resource limitation condition.

The first network radio entity 104, 116 transmits the data waiting to be transmitted on the estimated amount of frequency resources. A respective portion of the estimated amount of frequency resources is used for transmitting a respective portion of the data waiting to be transmitted in each scheduling occasion over which the scheduling time interval extends. In some embodiments the resource limitation condition may be specified such that the respective portion of the estimated amount of frequency resources used in the respective scheduling occasion is less than the maximum amount of frequency resources available per scheduling occasion for at least some of the scheduling occasions over which the scheduling time interval extends.

To perform the method steps above the first network radio entity 104, 116 comprises an arrangement 1100 according to a second aspect of the invention. The arrangement 1100 comprises a receiving unit 1102 that is adapted to receive an amount of data to be transmitted to the one or more receiving network radio entities 116, 104. It further comprises a resource unit 1104 that is connected to the receiving unit 1102. The resource unit 1104 is adapted to estimate an amount of frequency resources needed to transmit data waiting to be transmitted. The data waiting to be transmitted includes the received amount of data.

The arrangement 1100 further comprises a determining unit 1106 that is connected to the receiving unit 1102 and to the resource unit 1104. The determining unit 1106 is adapted to determine a resource limitation condition that prolongs a time needed to transmit the data waiting to be transmitted by at least one transmission time interval (TTI) as compared to the time needed to transmit the data waiting to be transmitted using a maximum amount of frequency resources available per scheduling occasion.

The arrangement 1100 further comprises a scheduling unit 1108 that is connected to the determining unit 1106 and to the resource unit 1104. The scheduling unit 1108 is adapted to schedule the data waiting to be transmitted. It is further adapted to apply the resource limitation condition so that the data waiting to be transmitted is scheduled for transmission in scheduling occasions within a scheduling time interval that extends over at least two scheduling occasions. The scheduling time interval depends on the resource limitation condition and on the estimated amount of frequency resources.

The arrangement 1100 further comprises a transmitting unit 1110 that is connected to the scheduling unit 1108. The transmitting unit 1110 is adapted to transmit the data waiting to be transmitted on the estimated amount of frequency resources. A respective portion of the estimated amount of frequency resources is used for transmitting a respective portion of the data waiting to be transmitted in each scheduling occasion over which the scheduling time interval extends.

By determining a resource limitation condition that prolongs the time needed to transmit the data waiting to be transmitted by at least one transmission time interval (TTI) the object of the invention is achieved in that the rate at which the interference varies with time is reduced. The reduction in variation can be achieved on a time scale that is considerably longer that one TTI. Thereby the predictability of inter-cell interference is improved, thus allowing other network radio entities such as radio base stations and mobile terminals in neighbouring cells to predict interference and take measures prior to transmission.

BRIEF DESCRIPTION OF THE DRAWINGS

The invention will now be explained in more detail by means of exemplary embodiments and with reference to the accompanying drawings, in which.

DETAILED DESCRIPTION

Briefly described, a solution is provided for mitigating the problem of unpredictable inter-cell interference, e.g. on-off interference behaviour, especially at low to medium traffic loads. This is achieved by smoothing of the inter-cell interference by distributing the transmission of data packets in time over more than one scheduling occasion, such that the inter-cell interference becomes less fluctuating. The distribution in time is determined such that the amount of frequency resources used by a network radio entity at a scheduling occasion is lower than the total amount of frequency resources available to the network radio entity for transmission at said scheduling occasion, and also such that the packets are transmitted within a certain time limit.

The invention derives advantage from that any data packets to be transmitted are allowed a certain delay before they are delivered to their destination, and that this allowed delay is typically much longer than the time between two consecutive scheduling occasions. Thereby, part of the packets to be transmitted may be deliberately delayed for a limited time period, substantially without inducing negative consequences regarding latency for the receiver of the packets. The packets could be delayed in a network radio entity for a time period corresponding to a number of scheduling occasions before being transmitted to one or more receiving network radio entities, as compared to a possible delivery time if all available frequency resources were to be used at each scheduling occasion. The allowable delay for a packet, until it reaches its destination, is set e.g. in the form of a packet delay budget.

Figure 1:
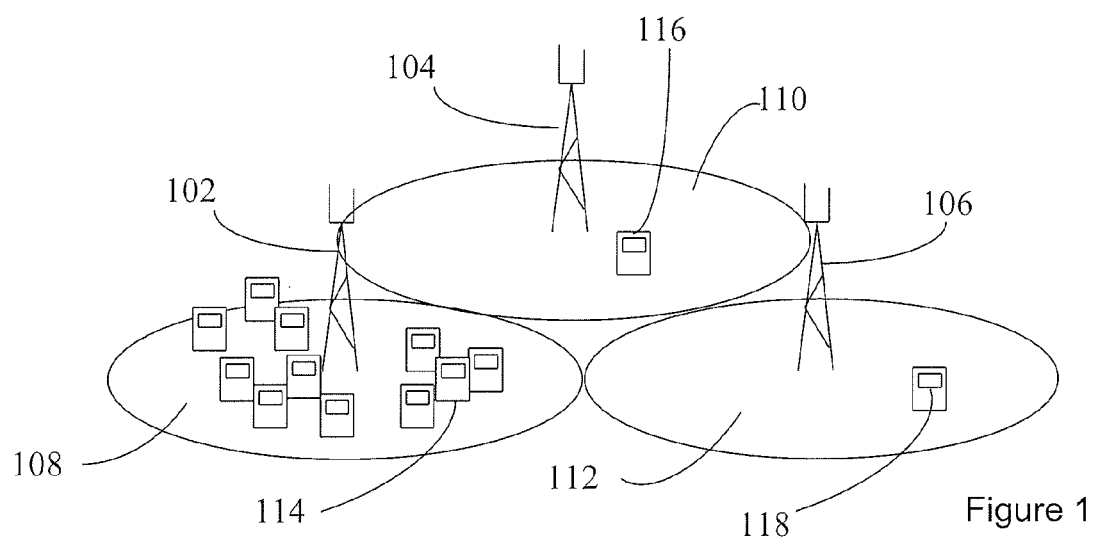
FIG. 1 is a schematic view illustrating a cellular communication system.

The invention is further able to utilize the fact that the traffic load is generally unevenly distributed in a radio access network, as illustrated in FIG. 1. In a sending network radio entity, data packets received for transmission are accumulated in one or more buffers before being transmitted by the network radio entity. The invention aims at smoothing out the interference generated by transmissions in cells having a low or medium traffic load in time, by estimating the amount of resources that are needed to transmit all packets in the buffer(s), and distribute these resources in both time and frequency.

Some Definitions:

Within this document, different expressions will be used when discussing the smoothing of inter-cell interference, some of which will be briefly defined here.

A "scheduling occasion" is an occasion when a scheduler or a scheduling function in a network radio entity allocates resources in order to transmit one or more packets, if such packets are present, e.g. in one or more service buffers of the network radio entity, to one or more other network radio entities. Scheduling occasions occur with a certain periodicity, corresponding to transmission time intervals (TTIs). In LTE scheduling occasions typically occur with an interval of 1 ms.

A "packet delay budget" is a time period, within which a packet should be delivered to its destination in order to fulfill some predefined requirement, e.g. related to a certain QoS (Quality of Service). For example, different services, applications and/or users may have different requirements on delay. Therefore, packet delay budgets may differ for different services, applications and/or users. Typically, the delay budget is set by the operator.

The "distribution time interval", "distribution time", or "$t_{distribution}$", refer to a time interval, over which an estimated amount of frequency resources carrying a certain amount of data, is to be distributed. This time interval is also called scheduling time interval in some embodiments. The time interval has a starting point and an end point. The distribution time interval or scheduling time interval corresponds to a certain number of scheduling occasions. The determination of the distribution time interval could be integrated as a part of determining a resource limitation condition used for restricting a scheduler, although it has been described in some embodiments as a separate procedure step in order to clarify and explain the smoothing procedure.

The time interval, or number of scheduling occasions, over which the transmission of data is distributed, can be either fixed or variable depending on e.g. the packets comprising the data. For example, the time interval may depend on the shortest packet delay budget of the packets waiting to be scheduled for transmission, or depend on the shortest packet delay budget of the most frequently occurring service types. The invention may be applied in both uplink and downlink transmissions.

The term "network radio entity" refers to a radio transmitting and/or receiving entity in a communication network. A "network radio entity" may be a mobile terminal or a network node, such as e.g. a base station (BS), eNB, or relay node (RN), or the like, which has packets of data to send or receive, according to the procedures described herein.

Regarding the distribution in frequency of the transmission of packets or data, it is assumed that a control function is present in the system, which controls e.g. the order in which network radio entities allocate different frequency resources. This control function could differentiate and/or coordinate the use of different frequency resources by e.g. instructing different network radio entities to start allocating resources for transmission from different frequencies, respectively, and to proceed allocating in different directions, in regard of frequency, for further transmissions. For example, one network radio entity could start allocating frequency resources from the lowest available frequency band and proceed upwards in frequency, and another network radio entity could start allocating frequency resources from the highest available frequency band and proceed downwards in frequency. The allocation could also involve different transmission schemes, e.g. frequency hopping, scattering in frequency, and/or take channel quality into account. However, such mechanisms are outside the scope of the invention.

FIG. 1 illustrates a cluster of cells in different traffic situations. One of the cells, 108, served by base station 102, has a high or maximal traffic load, while its neighbour cells 110, 112, served by base stations 104, 106 have a low or medium traffic load. In LTE systems, the main part of the interference experienced by network radio entities within a cell is typically generated by transmissions in neighbouring cells, so called inter-cell interference. This experienced inter-cell interference has a substantial influence on the channel quality within a cell. For example, a single mobile terminal 118 in cell 112, or 116 in cell 110, which generates a bursty on-off type of interference, may reduce the throughput for a large number of mobile terminals 114 in cell 108 to less than 50%, as compared to a situation when no interference is generated in cells 112 or 110. The reduction in throughput in cell 108 results from the fact that the bursty inter-cell interference is difficult to predict, and thereby, the coding and modulation schemes used are not adequately adapted to the actual channel quality.

As mentioned above, the inter-cell interference can be smoothed over time by means of the embodiments described. Below, different features and aspects of the smoothing effect will be described.

A procedure according to one embodiment will now be described with reference to the flow diagram in FIG. 2, which can be used to achieve the above smoothing effect. Initially, data is received in packets in a step 202, which packets are stored in a memory, such as one or more buffers. The packets could be stored in one buffer per service or per user, or any other arrangement used in the network radio entity for buffering packets.

Then, the amount of frequency resources needed in order to transmit the data to destination(s), is estimated in a step 204. A frequency resource could be a group of time/frequency resources, such as e.g. a resource block pair in LTE, i.e. 12 subcarriers during 1 ms. The estimation in step 204 requires information concerning how much data that could be carried by each frequency resource. Such information could be derived from information retrieved from e.g. a link adaptation function and/or a scheduling function, e.g. in the form of estimated channel quality, capacity, and/or choice of coding and modulation schemes. When the estimated channel capacity and the coding and modulation schemes are known, an estimate of the amount of frequency resources needed to carry a certain amount of data can be calculated. Then a distribution time interval $t_{distribution}$ is determined in a step 206, based on at least one time limit. The distribution time interval, also called scheduling time interval, could be a fixed period in time, or a variable period in time. The variable period in time could be e.g. the shortest delay budget of the packets carrying data waiting to be transferred minus a certain appropriate safety margin.

Then, a resource limitation condition that depends on the distribution time interval is determined in a step 208. Then, the resource limitation condition is imposed in a step 210 on the scheduling unit in order to achieve a distribution of the transmission of data in time, i.e. over the distribution time interval. The resource limitation condition restricting the scheduling unit could e.g. be expressed as a maximum amount of frequency resources available per scheduling occasion, which could be used by the scheduling unit at each scheduling occasion, or as a maximum amount of data to be scheduled at each scheduling occasion. At low to medium traffic loads, the determined distribution, achieved by the imposed resource limitation condition, entails that the amount of frequency resources used at each scheduling occasion is lower than the maximum amount of frequency resources, which are available to the network radio entity for scheduling at each scheduling occasion, i.e. a certain amount of the available frequency resources at each scheduling occasion are deliberately left unused. This, in turn, implies that the inter-cell interference generated by the transmission of the data varies less in time, and is thereby more predictable to a network radio entity in a neighbouring cell. Then, the data is scheduled in a step 212 according to the distribution and restriction made, and transmitted in a step 214.

Figure 2:
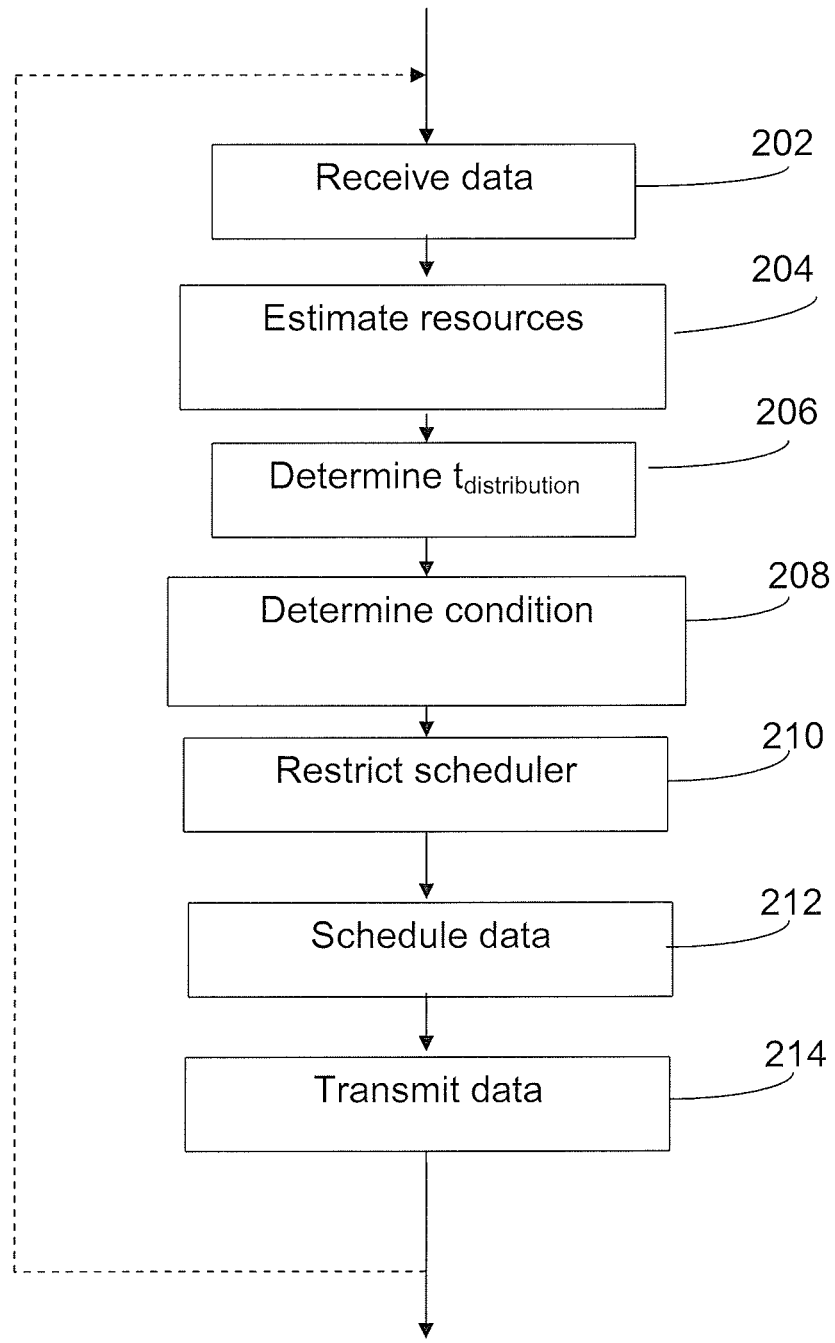
FIG. 2 is a flowchart illustrating a method for radio transmission according to one exemplary embodiment.

As indicated above, the flow chart in FIG. 2 may be modified such that step 206 could be seen as an integrated part of step 208. The resource limitation condition determined in step 208 could then be described as a condition depending on at least one time limit, instead of depending on the distribution time interval. If step 206 is not integrated in step 208, the steps 204 and 206 could alternatively be performed simultaneously, or in the reverse order, e.g. when $t_{distribution}$ is fixed, and does not depend on the amount of estimated frequency resources.

By way of a non-limiting example, the scheduling 212 and transmission 214 at two consecutive scheduling occasions could be described as follows:

i) step 212 involves selecting a first part $N_{first}$ of the estimated amount of frequency resources $N_{total}$, corresponding to a first part of the data waiting to be transmitted, from a total amount of frequency resources $N_{avail}$ which are available for scheduling at a first scheduling occasion, wherein said first part $N_{first}$ of the estimated amount of frequency resources $N_{total}$ is determined from a resource limitation condition C that depends on at least one time limit and wherein the first part $N_{first}$ of the estimated amount of frequency resources $N_{total}$ is less than the total or maximum amount of frequency resources $N_{avail}$ which are available for scheduling at said first scheduling occasion;

in this example, step 212 further involves ii) selecting at least one subsequent part $N_{subsequent}$ of the estimated amount of frequency resources, corresponding to at least one subsequent part of the packets waiting to be transmitted, from the total amount of frequency resources which are available for scheduling at at least one subsequent scheduling occasion, wherein said at least one subsequent part of the estimated amount of frequency resources is determined from said resource limitation condition that depends on said at least one time limit and wherein the at least one subsequent part $N_{subsequent}$ of the estimated amount of frequency resources is less than the total or maximum amount of frequency resources which are available for scheduling at said at least one subsequent scheduling occasion, and in this example, step 214 involves iii) transmitting said first part of the data waiting to be transmitted using said selected first part of the estimated amount of frequency resources at said first scheduling occasion and transmitting said at least one subsequent part of the data waiting to be transmitted using said selected at least one subsequent part of the estimated amount of frequency resources at said at least one subsequent scheduling occasion.

Below, an exemplary arrangement 300, adapted to enable the performance of the above described procedure in a first network radio entity, will be described with reference to FIG. 3. The arrangement 300 comprises a receiving unit 302, adapted to receive data to be transmitted to one or more other network radio entities. The receiving unit is further adapted to store the received data packets, e.g. in some suitable buffer(s), while they are waiting to be scheduled and transmitted. The arrangement 300 further comprises a resource unit 310, adapted to estimate the amount of frequency resources needed to transmit data waiting to be transmitted. The data waiting to be transmitted may e.g. be data in packets arriving in a most recent burst, and potentially other, previously received or generated, packets of data waiting to be transmitted. In addition to information on the amount of data waiting to be transmitted and/or the number of and size of packets comprising the data, the resource unit 310 should have access to information concerning, e.g., the estimated channel quality, capacity, and/or choice of coding and modulation schemes for a next scheduling occasion, and possibly also for a number of future scheduling occasions. Such information could be obtained from a link adaptation function (not illustrated) and/or from a scheduling unit 318. When e.g. the estimated channel capacity and/or the coding and modulation schemes are known, an estimate of the number of packets or the amount of data which could be carried in one frequency resource and/or the amount of frequency resources needed to carry a certain number of data packets or a certain amount of data can be calculated.

The arrangement 300 further comprises a determining unit 304, adapted to determine a distribution time interval $t_{distribution}$ depending on at least one time limit. The determining unit 304 is further adapted to determine a resource limitation condition that depends on the distribution time interval. The determining unit 304 should have access to the number of packets or amount of data which could be transmitted per frequency resource and/or amount of frequency resources estimated in the resource unit 310, and to information concerning e.g. the packets of data to be transmitted, such as their delay budget and/or other service or user-related properties. The distribution time interval could be fixed or variable, as previously stated. An exemplary distribution time interval could be in the interval of 20-40 ms, i.e. encompassing 20-40 scheduling occasions in LTE. The resource limitation condition could be expressed e.g. as a maximum amount of frequency resources available per scheduling occasion.

The arrangement 300 further comprises a restricting unit 306, adapted to impose the determined resource limitation condition on a scheduling unit 318, thereby restricting the scheduling unit 318 in terms of frequency resource allocation. The restriction causes the scheduling unit 318 to allocate at most a part of the frequency resources available for allocation at a scheduling occasion, i.e. a part determined by the resource limitation condition. The scheduling unit 318 is adapted to schedule data for transmission according to the resource limitation condition. The arrangement 300 further comprises a transmitting unit 308, adapted to transmit the data to one or more other network radio entities.

The whole arrangement 300, or selected parts of the arrangement 300, could be regarded as an advanced scheduler.

Figure 3:
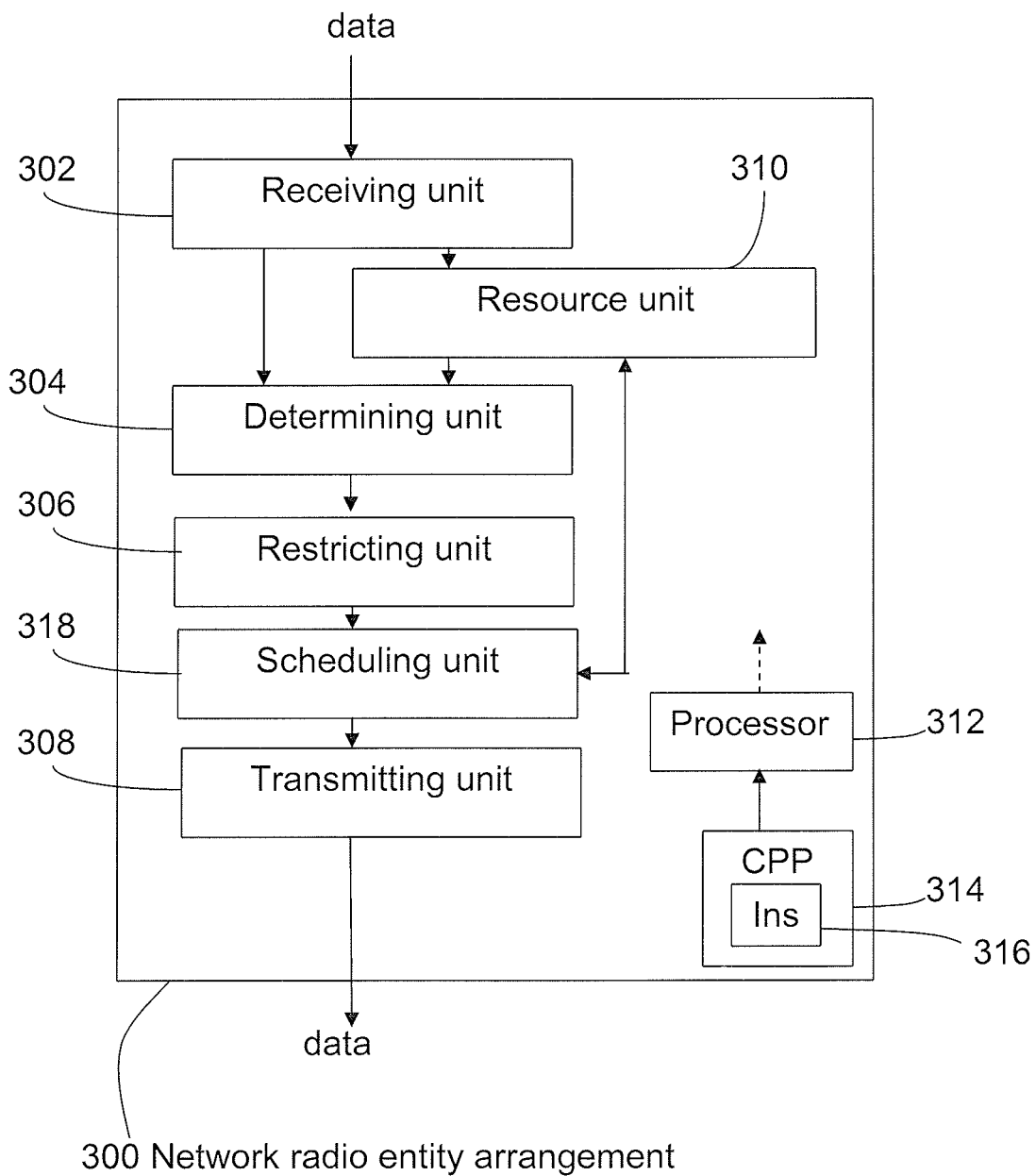
FIG. 3 is a block diagram illustrating an embodiment of an arrangement in a network radio entity.

In FIG. 3 is also illustrated a computer program product 314 which comprises instructions 316, which when executed by a processor 312 or similar, will cause the units 302-310 and 318, respectively, to perform their tasks according to an embodiment of the described procedure. Connections between the processor 312 and the units 302-310 and 318 are illustrated by a dashed arrow.

Advantages of the invention can be understood by first studying a procedure according to prior art and its effects.

Figure 4:
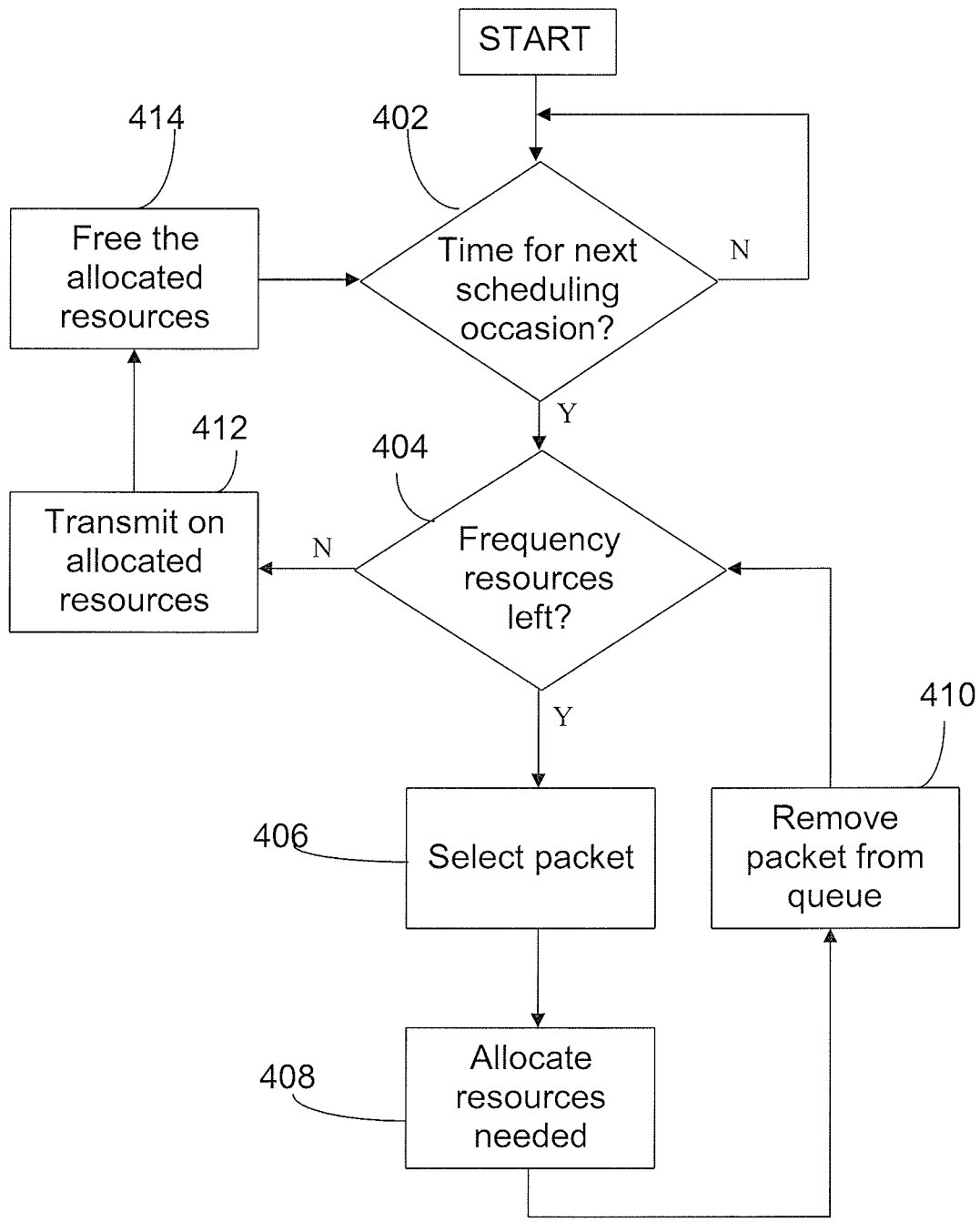
FIG. 4 is a flowchart illustrating a scheduling procedure according to prior art.

Firstly, a flowchart of a scheduling procedure in a typical packet scheduler of a network radio entity according to the prior art is illustrated in FIG. 4. At each scheduling occasion, frequency resources are allocated for packets of data to be transmitted, until there are no resources left to allocate at said scheduling occasion. In FIG. 4, this is illustrated by a step 402 of determining if it is time for a new scheduling occasion, and when it is time, it is determined in a next step 404, whether there are any available frequency resources left or not. As long as there are packets left to be scheduled and available frequency resources left 404, new frequency resources are allocated 408, e.g. to one packet at a time 406, until there are no available frequency resources left to allocate. The packets, for which resources have been allocated, are removed 410 from the queue of packets to be scheduled. When there are no resources left to allocate, the packets, for which resources have been allocated, are transmitted 412 on said allocated resources, after which the allocated resources are released 414 in order to be available for allocation at the next scheduling occasion. The procedure of FIG. 4 is started when there are packets to be scheduled, and terminated when there are no packets left to be scheduled.

Figure 5:
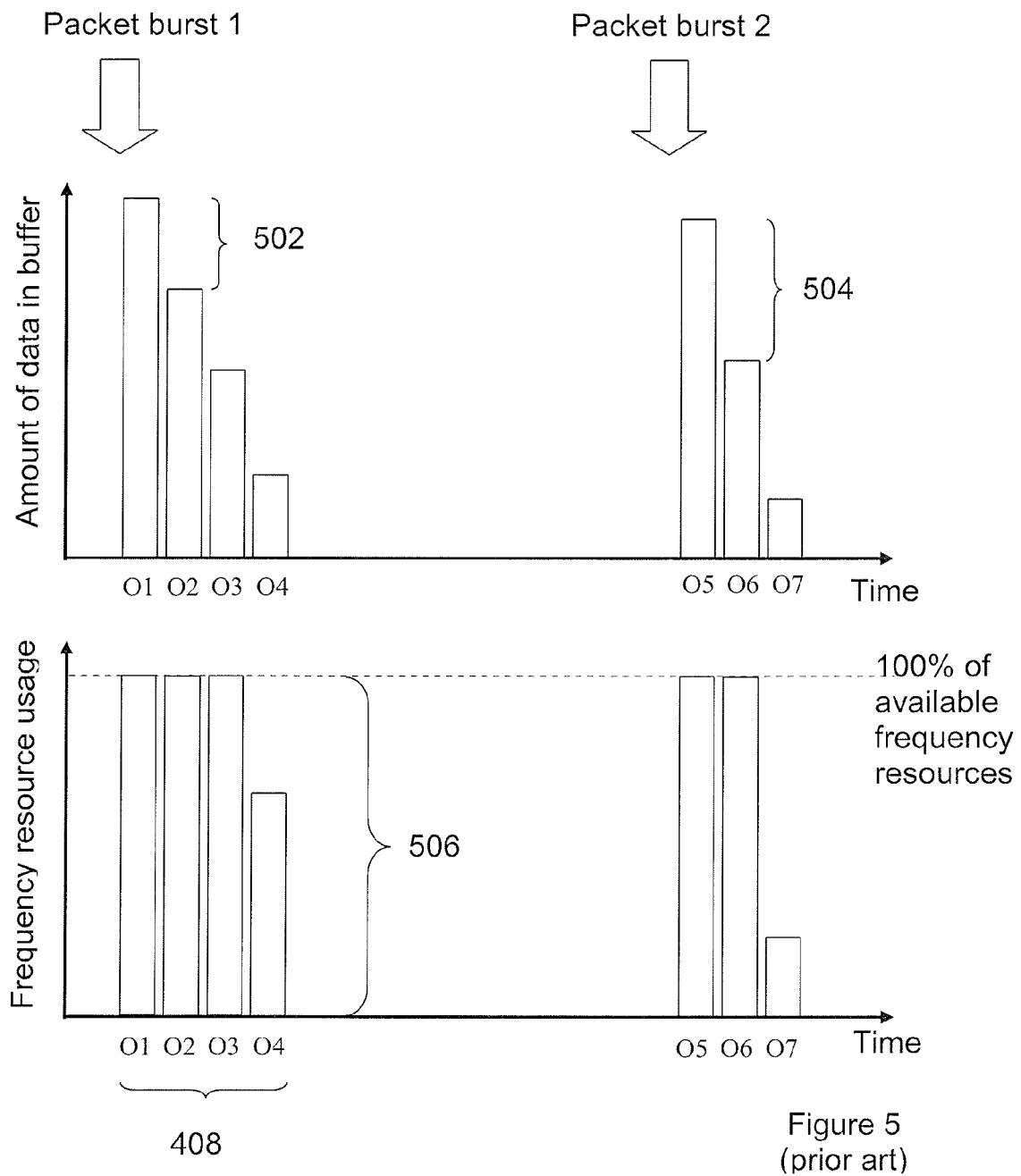
FIG. 5 illustrates the effect of using the scheduling procedure of FIG. 4.

The effect of using the scheduling procedure in FIG. 4 is schematically illustrated in FIG. 5. The upper graph in FIG. 5 illustrates the amount of data to be scheduled for transmission, waiting in the buffer(s) of a network radio entity, per scheduling occasion. The lower graph illustrates the frequency resource usage of the network radio entity, per scheduling occasion. The time axis has been provided with references O1-O7, illustrating different scheduling occasions. Above the upper graph, two arrows illustrate the arrival of data packet bursts to the network radio entity. The arriving data packets are stored in one or more buffers, e.g. depending on which type of service they represent. The scheduler of the network radio entity then schedules the data for transmission to their destination(s) at first available opportunity, by allocating all available resources for transmission at each scheduling occasion, until there are no packets left to be transmitted. The amount of data remaining in the buffer(s) is thereby comparably rapidly reduced, as illustrated by the numerals 502 and 504. The lower graph can be seen as an illustration of the interference experienced in a neighbouring cell, in respect of the on-off behaviour over the whole available frequency band 506.

Figure 6:
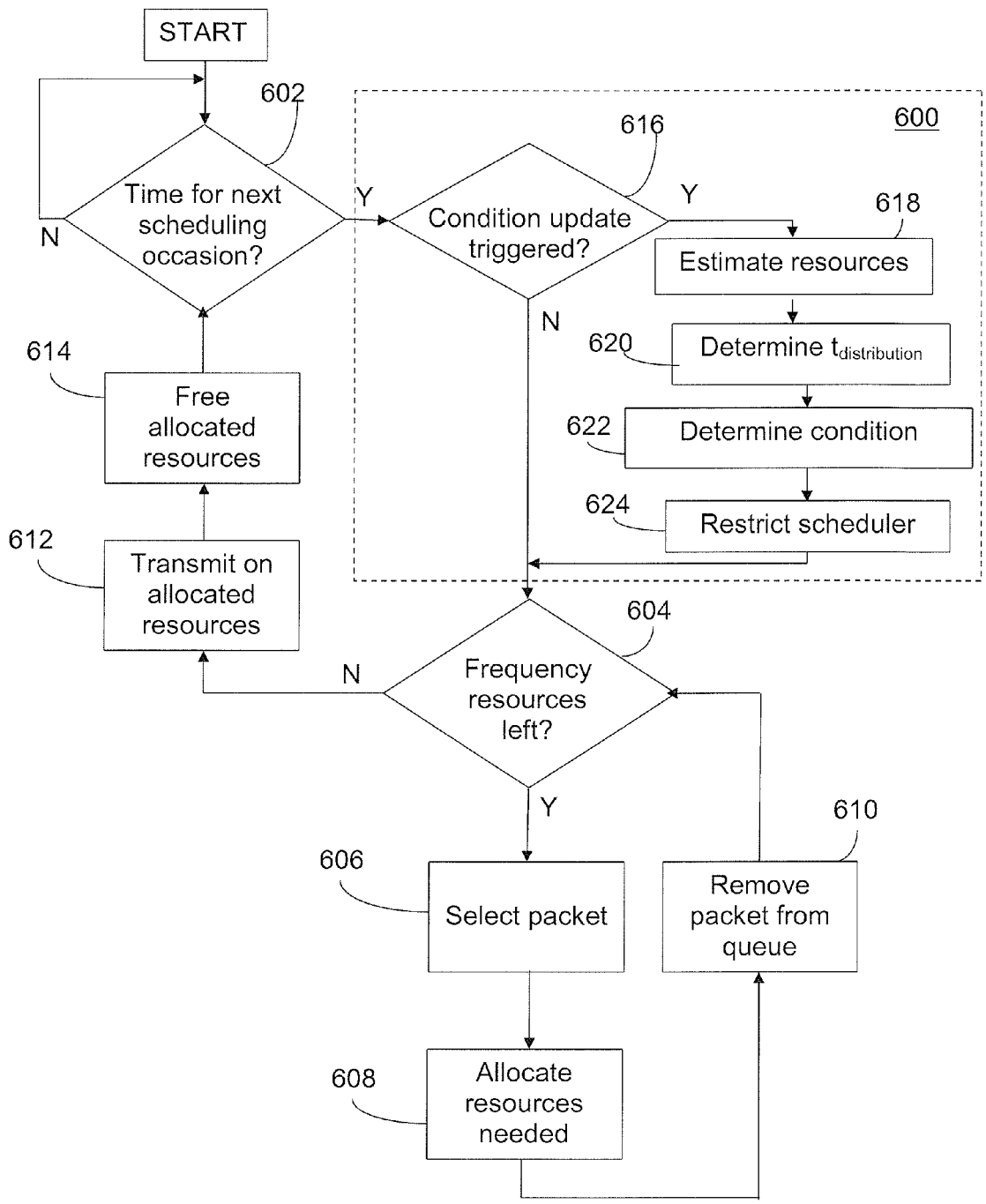
FIG. 6 is a flowchart illustrating a scheduling procedure according to one embodiment.

A flowchart of a scheduling procedure in a packet scheduler according to an embodiment of the invention is illustrated in FIG. 6. The basic steps 602-614 are similar to the steps 402-414, illustrated in FIG. 4. However, in FIG. 6, a new set 600 of steps, 616-624, is introduced, according to an embodiment. When it has been determined in a step 602 that it is time for a next scheduling occasion, it is determined in a step 616 if an update of the resource limitation condition has been triggered. The events which may trigger an update will be further described below. If an update has not been triggered, the procedure continues with scheduling and resource allocation 604-610 according to a previously determined resource limitation condition. If no applicable previously determined resource limitation condition is available, a default condition could be used.

When an update of the resource limitation condition is triggered, the number of packets or amount of data which could be transmitted per frequency resource and/or the amount of frequency resources needed in order to transmit the data packets waiting in one or more buffers to be transmitted, is determined in a step 618. This could be achieved using information concerning the estimated capacity of the channel and concerning which coding and modulation schemes to use in a forthcoming transmission. Such information could be obtained from e.g. a link adaptation function and/or the scheduling function. Based on the above information, the number of information bits that could be transmitted per frequency resource could be calculated, and thereby, the amount of frequency resources needed to transmit the data waiting to be transmitted could be derived.

Then, a distribution time interval $t_{distribution}$ is determined in a step 620, within which the packets waiting to be transmitted should be transmitted. The distribution time interval could be a fixed period of time, i.e. a fixed number of scheduling occasions, selected to be shorter than e.g. the delay budget of a certain service. Alternatively, the distribution time interval could be a function depending on a variable time limit, such as one or more of the delay budgets of the packets waiting to be transmitted. Then, a resource limitation condition based on $t_{distribution}$ is determined 622. The resource limitation condition could be e.g. that all packets having arrived before a certain time $t_x$ should be delivered before time $t_x+t_{distribution}$, where $t_x$ is the time when, e.g. an update of the resource limitation condition is triggered. The resource limitation condition could be expressed e.g. as an amount of frequency resources to be used at each scheduling occasion, or as an amount of data to be scheduled at each scheduling occasion.

Then, the determined resource limitation condition is imposed on the scheduling unit in a step 624, in order to achieve a distribution of the data waiting to be transmitted over the time interval $t_{distribution}$. By imposing 624 the resource limitation condition on the scheduling unit, the scheduling unit is restricted to using e.g. at most a certain amount of frequency resources per scheduling occasion, or to schedule at most a certain amount of data per scheduling occasion, depending on how the resource limitation condition is expressed. Then, scheduling and allocation of resources is performed 604-610, under the restriction of the resource limitation condition, which will result in that the transmission of the data waiting to be transmitted is distributed over the distribution time interval $t_{distribution}$, given that no further update of the resource limitation condition is triggered before the expiration of $t_{distribution}$. The performing of steps 618-622 may result in a condition, which is equivalent or identical to the currently used resource limitation condition. The step 624 could in such cases be cancelled, since it would have no effect on the further procedure to replace a current condition on the scheduling unit with an equivalent or identical condition.

The resource limitation condition could be determined as follows:

The amount of packets "Ptot" waiting to be transmitted should be transmitted within the time interval $t_{distribution}$, which corresponds to Sd scheduling occasions or subframes. The radio link is determined to be able to carry "Pfr" packets per frequency resource. The resource limitation condition to be imposed on the scheduler may then be expressed as Ptot/(Sd*Pfr)=$N_{cond}$ frequency resources per scheduling occasion, or Ptot/Sd=$P_{cond}$ packets per scheduling occasion. The latter resource limitation condition will result in that approximately $N_{cond}$ frequency resources are allocated at each scheduling occasion.

It is assumed that there are a limited amount of frequency resources $N_{avail}$ available at each scheduling occasion.

Therefore, the amount of frequency resources to be used by the scheduler at each scheduling occasion should be the smaller one of $N_{cond}$ and $N_{avail}$, i.e. $N_{occasion}$=min ($N_{cond}$, $N_{avail}$). Further, the use of the above procedure for smoothing interference could be restricted to certain load conditions for example below a predetermined load level.

When the time interval $t_{distribution}$ has been determined, an exemplary resource limitation condition could also be defined as the following algorithm, using pseudo code:

Initialize:
$N_{total}$=0
For each user U with packets to schedule:
$B_u$=sum of size of all packets belonging to user u in bits
$C_u$=estimated number of bits per frequency resource for user u
$N_{total}$=$N_{total}$+ceil ($B_u/C_u$)
End for:
$N_{occasion}$=min ($N_{avail}$, $N_{total}$/Sd)

where $N_{occasion}$ is the restricted or reduced amount of frequency resources that the scheduler may use in the current scheduling occasion, $N_{total}$ is the total amount of frequency resources needed to transmit all data waiting to be transmitted, $N_{avail}$ is the total or maximum amount of frequency resources that the bandwidth of the system allows per scheduling occasion, and $t_{distribution}$ is the time interval within which all data should be transmitted, corresponding to Sd number of subframes. "ceil" indicates a round up to the closest higher integer.

An update of the resource limitation condition could be triggered by a number of different events. For example, an update of the resource limitation condition could be triggered when a new burst of data packets to be scheduled arrives to the network radio entity, or by that a predetermined time has elapsed since the last update. When it is desirable to update the resource limitation condition at every scheduling occasion, the trigger could either be omitted, and thereby the update procedure be performed at every scheduling occasion, or the trigger could be set to be triggered once every scheduling occasion. An update of the resource limitation condition could further be triggered when the rate of arrival of new data packets changes above or below a certain threshold level, or when a certain change of radio conditions occurs. An update could further be triggered by a change of coding and/or modulation scheme, or when there is a change in the number of available frequency resources or any other event that changes $N_{total}$ by a significant amount.

Regarding the distribution time interval, the transmission of data packets could be distributed over a fixed period in time, i.e. covering a certain number of scheduling occasions, as previously mentioned. This fixed period in time should be determined such that different types of data packets could be delivered within their respective delay budgets, but could otherwise be selected according to current needs or preferences. Alternatively, the time interval over which transmission of the data is distributed could depend on a variable time limit, e.g. the shortest packet delay budget of the packets of a certain priority waiting to be scheduled for transmission. Such a dynamic distribution time interval implies that the time interval over which the estimated amount of frequency resources is distributed could be as long as the delay budgets of the packets comprising data waiting to be transmitted allows.

Figure 7:
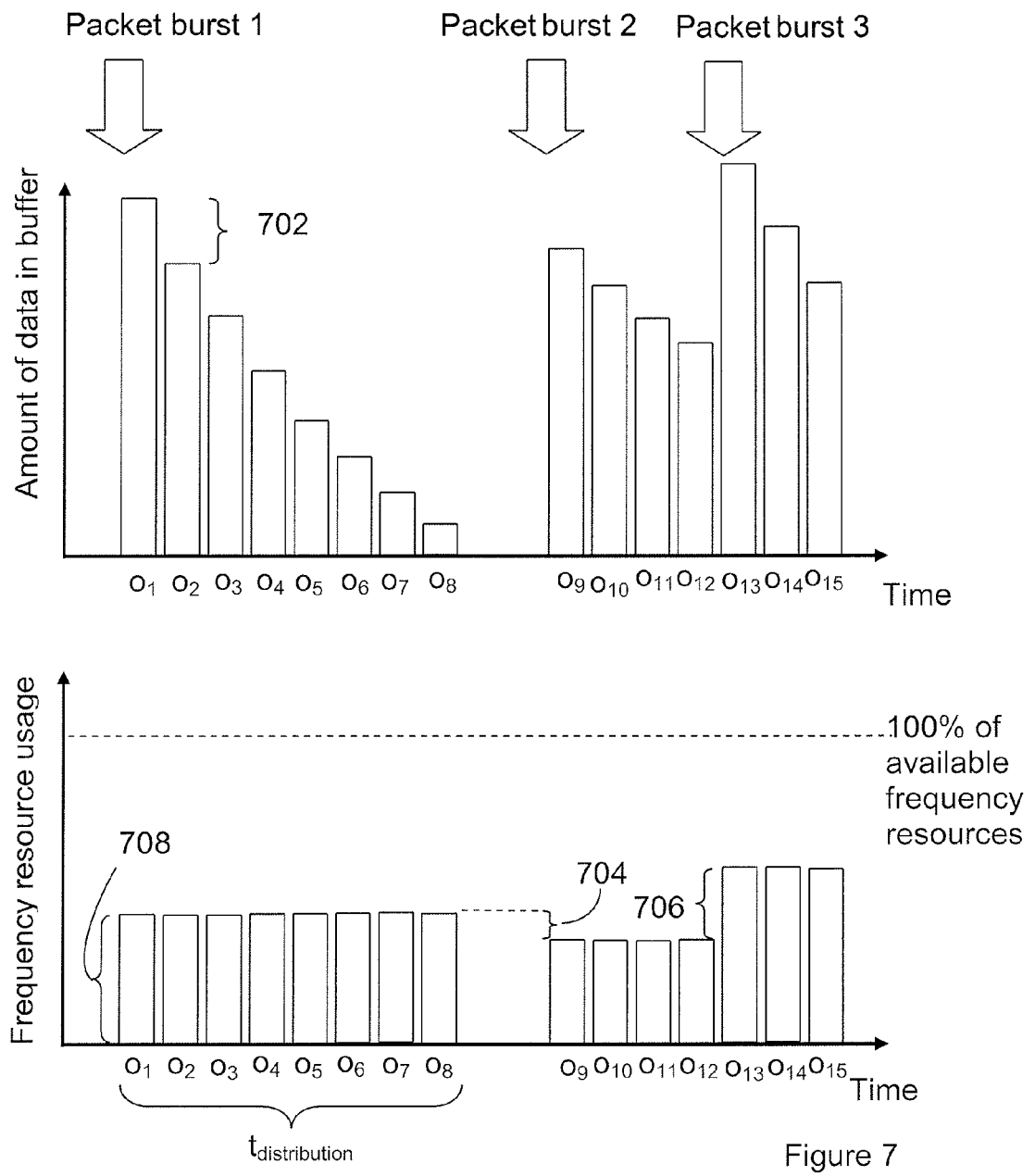
FIG. 7 illustrates the effect of using the scheduling procedure of FIG. 6.

The effect of using the scheduling procedure in FIG. 6 is schematically illustrated in FIG. 7. The upper graph in FIG. 7 illustrates the amount of data to be scheduled and transmitted, waiting in the buffer(s) of a network radio entity, per time unit. The lower graph illustrates the frequency resource usage of the network radio entity, per time unit, where the time scale is the same as in the upper graph. The time axis has been provided with references $o_1$-$o_{15}$, illustrating different scheduling occasions. Above the upper graph, three arrows illustrate the arrival of data packet bursts to the network radio entity. The data packets are stored in one or more buffers, e.g. depending on which type of service they represent. The scheduler of the network radio entity then schedules the data, and the data is transmitted to its destination(s). The amount of data remaining in the buffer(s) is thereby gradually reduced, as illustrated by the numeral 702. The arrival of a new data burst triggers a resource limitation condition update procedure, which results in a new restriction on the scheduler, i e a new resource limitation condition to be applied by the scheduling unit. The change in resource limitation condition can be seen as changes 704, 706, in frequency resource usage between different scheduling occasions. Such changes in frequency usage could also be a result of e.g. changes in radio link capacity, etc. It should be noted that the magnitudes 702 and 708 in FIG. 7 are not comparable, since 702 is an amount of data, e.g. expressed in bits or packets, which are transmitted at one scheduling occasion, and 708 is a frequency resource usage in percent at one scheduling occasion.

Figure 8:
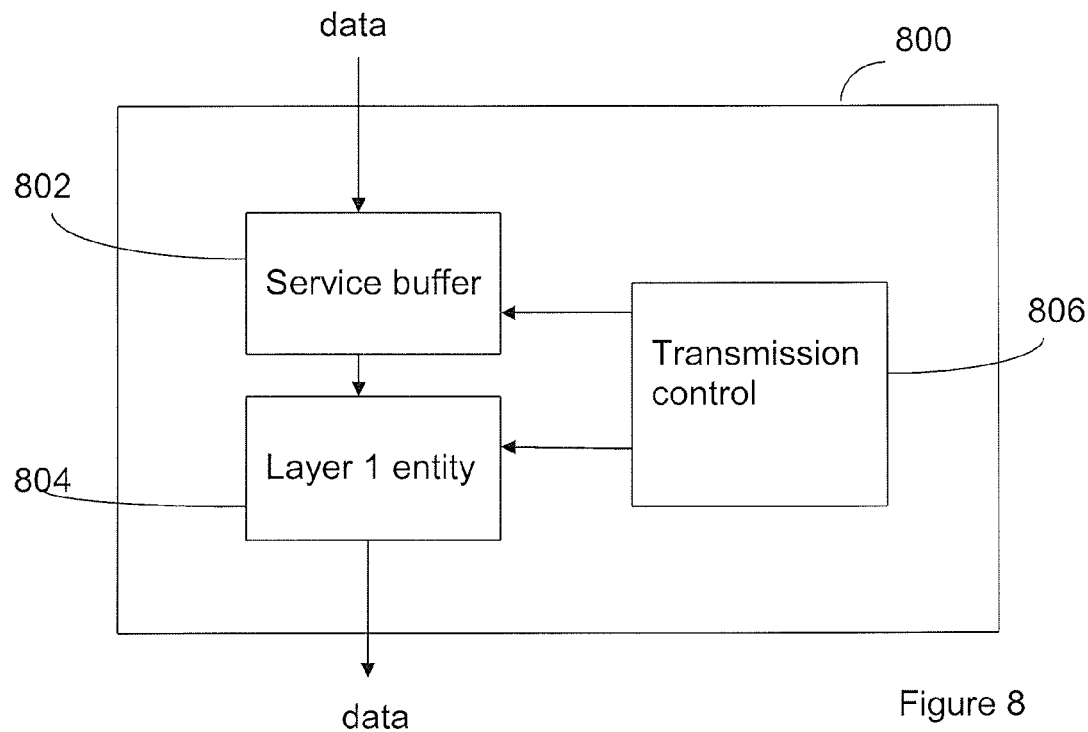
FIGS. 8 and 9 are block diagrams illustrating network radio entities where embodiments of the invention could be applied.

FIG. 8 shows a simple example structure 800 of a network radio entity where an embodiment of the invention may be applied. The structure comprises a service buffer 802 to which data packets arrive after reception; a layer 1 entity 804, where data packets arrive before being transmitted; and a transmission control entity 806 for controlling e.g. which data packets should be transmitted to different network radio entities, and when, and on which resources the data packets should be transmitted. The herein described embodiments can be implemented in the transmission control entity 806, which may also be called a packet scheduler.

Figure 9:
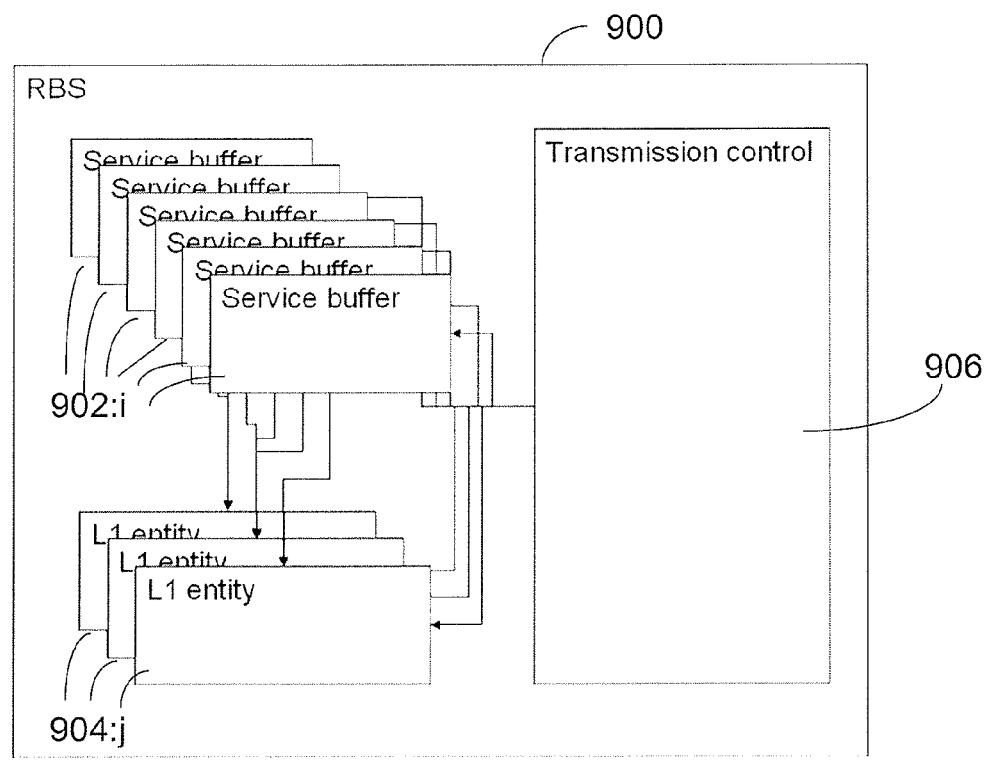

FIG. 9 shows a more detailed example structure 900 of how the network radio entity in FIG. 8 can be implemented, and where an embodiment of the invention may be applied. Here, it is shown that the service buffer 802 illustrated in FIG. 8 could be composed of a number of different buffers 902, which could be virtual or physical buffers. In this example, the buffers 902 are different service buffers, i.e. there is e.g. one buffer per service or group of services, which handles the data packets related to said service or group of services. The illustrated service buffers correspond to the logical channels in LTE. Further, the layer 1 entity 804 shown in FIG. 8 is here implemented as a number of layer 1 entities 904, e.g. one per other network radio entity, with which the network radio entity communicates or is about to communicate. The illustrated layer 1 entities correspond to the physical layer in LTE. The number of service buffers and layer 1 entities could be dynamically variable according to traffic situation, when implemented in software. The illustrated transmission control 906 corresponds to a MAC scheduler in LTE. As previously stated, the embodiments of the invention belong in the transmission control part 906.

The described smoothing procedure is expected to be most effective when used in network radio entities having low to medium traffic load. At approximately maximal traffic load, the smoothing procedure may converge to using all available frequency resources at each scheduling occasion, and thereby give the same transmission and interference result as a conventional scheduler. Therefore, the use of the smoothing procedure could be limited to certain traffic loads, in order to avoid that an amount of steps, which have no effect, are performed in a scheduler at e.g. approximately maximal load The method in the first network radio entity 104, 116 for improving predictability of inter-cell interference in a wireless communication system, according to the present solution will now be described with reference to FIG. 10. As mentioned above, the first network radio entity 104, 116 is located in a first cell 110. The prediction of the interference is made prior to transmission of data by at least one neighbouring network radio entity 102, 114 located in a neighbouring cell 108. The interference is generated by transmission of data from the first network radio entity 104, 116 to one or more receiving network radio entities 116, 104 located in said first cell 110. In some embodiments the first network radio entity may be a base station and the one or more receiving network radio entities may be mobile terminals. The method comprises the following steps, which may be taken in any appropriate order:

Step 1002

The first network radio entity 104, 116 receives an amount of data to be transmitted.

Step 1004

The first network radio entity 104, 116 estimates an amount of frequency resources needed to transmit data waiting to be transmitted, including the received amount of data.

Step 1006

The first network radio entity 104, 116 determines a resource limitation condition that prolongs a time needed to transmit the data waiting to be transmitted by at least one transmission time interval (TTI) as compared to the time needed to transmit the data waiting to be transmitted using a maximum amount of frequency resources available per scheduling occasion.

According to some embodiments the resource limitation condition may specify a maximum amount of data to be scheduled at each scheduling occasion. The resource limitation condition may also, additionally or alternatively, specify a reduced amount of frequency resources available at one scheduling occasion, as compared to the maximum amount of frequency resources available per scheduling occasion. In addition to or alternatively to the above specifications, the resource limitation condition may specify a period in time to be used as the scheduling time interval.

At least one of the following parameters may be taken into account when determining the resource limitation condition: An earlier determined time interval that is to be applied as said scheduling time interval, a respective delay budget of packets comprising the data waiting to be transmitted, the estimated amount of frequency resources needed to transmit the data waiting to be transmitted, current channel coding and modulation schemes and/or estimated or predicted future channel coding and modulation schemes, a respective priority of the packets comprising the data waiting to be transmitted, and a rate of arrival of bursts of packets comprising new data to be transmitted.

According to some embodiments, an update of the resource limitation condition may be triggered when a criterion is fulfilled. The estimation step 1004 and/or the determining step 1006 may then be performed when the update of the resource limitation is triggered, while an earlier determined resource limitation condition or a default condition is applied at the scheduling step 1008 otherwise.

The criterion may be fulfilled when the estimated amount of frequency resources needed to transmit the data waiting to be transmitted changes significantly.

According to further embodiments the criterion may be fulfilled when one or more of the following conditions apply: New data to be transmitted is received, a predetermined time has elapsed since last update, the rate of arrival of new data to be transmitted has changed significantly, a certain change of radio conditions occurs, the coding and/or modulation scheme is changed, and/or a change of available frequency resources occurs.

Step 1008

The first network radio entity 104, 116 schedules the data waiting to be transmitted. At the scheduling, the resource limitation condition is applied so that the data waiting to be transmitted is scheduled for transmission in scheduling occasions within a scheduling time interval that extends over at least two scheduling occasions. The scheduling time interval depends on the resource limitation condition and on the estimated amount of frequency resources.

According to some embodiments the scheduling time interval may be selected so that it is shorter than a respective delay budget of packets comprising the data waiting to be transmitted and so that said resource limitation condition is fulfilled. The respective delay budget of each of said packets comprising the data waiting to be transmitted defines a respective maximum allowable delay time for each of said packets comprising the data waiting to be transmitted. At least some of the data waiting to be transmitted may be scheduled so that it is deliberately delayed before being transmitted within said scheduling time interval.

According to some embodiments the predictability of inter-cell interference is improved in that the rate at which the interference varies with time is reduced by applying the resource limitation condition when scheduling the data waiting to be transmitted.

Step 1010

The first network radio entity 104, 116 transmits the data waiting to be transmitted on the estimated amount of frequency resources. A respective portion of the estimated amount of frequency resources is used for transmitting a respective portion of the data waiting to be transmitted in each scheduling occasion over which the scheduling time interval extends. In some embodiments the resource limitation condition may be specified such that the respective portion of the estimated amount of frequency resources used in the respective scheduling occasion is less than the maximum amount of frequency resources available per scheduling occasion for at least some of the scheduling occasions over which the scheduling time interval extends.

Step 1012

In this optional step according to some embodiments, an indication may be received that at least one neighboring network radio entity 102, 114 is experiencing interference from said first network radio entity. The indication may be received by said first network radio entity over an X2 interface from the at least one neighboring network radio entity 102, 114. The indication may be received in one of a Relative Narrowband Transmit Power, RNTP, message or a High Interference Indicator, HII, message or a Overload Indication, OI, message. The reception of this indication may result in an activation of the method for improving the predictability of interference generated by the first network radio entity.

Figure 11:
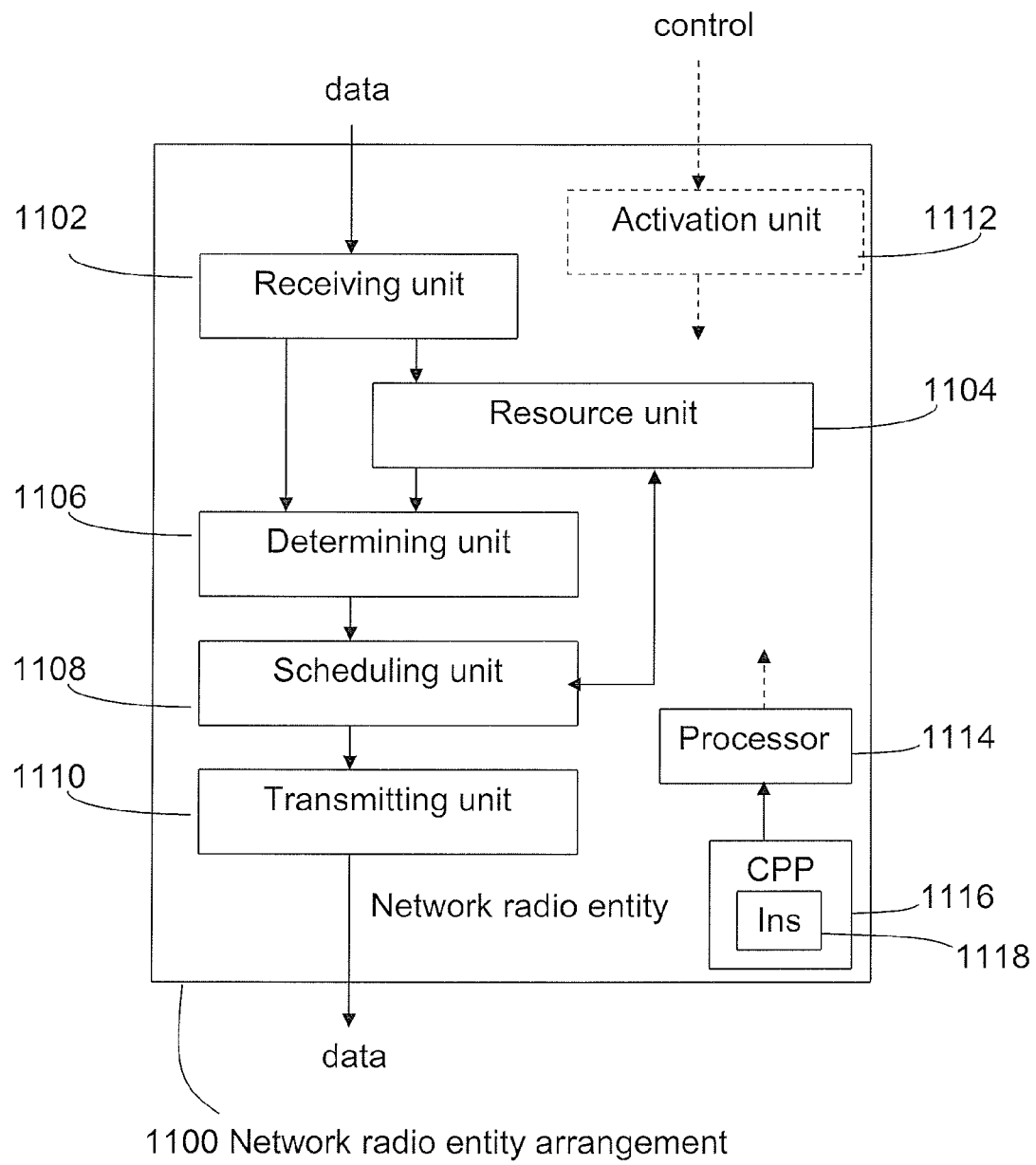
FIG. 11 is a block diagram illustrating an embodiment of an arrangement in a network radio entity.

To perform the method steps above the first network radio entity 104, 116 comprises an arrangement 1100 depicted in FIG. 11. As mentioned above, the first network radio entity 104, 116 is located in a first cell 110. The prediction of the interference is made prior to transmission of data by at least one neighbouring network radio entity 102, 114 located in a neighbouring cell 108. The interference is generated by transmission of data from the first network radio entity 104, 116 to one or more receiving network radio entities 116, 104 located in said first cell 110. In some embodiments the first network radio entity may be a base station and the one or more receiving network radio entities may be mobile terminals.

The arrangement 1100 comprises a receiving unit 1102 that is adapted to receive an amount of data to be transmitted to the one or more receiving network radio entities 116, 104. The receiving unit 1102 is further adapted to store the received data packets, e.g. in some suitable buffer(s), while waiting to be scheduled and transmitted.

The arrangement 1100 further comprises a resource unit 1104 that is connected to the receiving unit 1102. The resource unit 1104 is adapted to estimate an amount of frequency resources needed to transmit data waiting to be transmitted. The data waiting to be transmitted includes the received amount of data. The functioning of resource unit 1104 is analogous to that of the resource unit 310 in FIG. 3 and demands for information and other details described for resource unit 310 applies in a corresponding way to resource unit 1104.

The arrangement 1100 further comprises a determining unit 1106 that is connected to the receiving unit 1102 and to the resource unit 1104. The determining unit 1106 is adapted to determine a resource limitation condition that prolongs a time needed to transmit the data waiting to be transmitted by at least one transmission time interval (TTI) as compared to the time needed to transmit the data waiting to be transmitted using a maximum amount of frequency resources available per scheduling occasion. The determining unit 1106 should have access to the number of packets or amount of data which could be transmitted per frequency resource and/or amount of frequency resources estimated in the resource unit 1104, and to information concerning e.g. the packets of data waiting to be transmitted, such as their delay budget and/or other service or user-related properties.

The arrangement 1100 further comprises a scheduling unit 1108 that is connected to the determining unit 1106 and to the resource unit 1104. The scheduling unit 1108 is adapted to schedule the data waiting to be transmitted. It is further adapted to apply the resource limitation condition so that the data waiting to be transmitted is scheduled for transmission in scheduling occasions within a scheduling time interval that extends over at least two scheduling occasions. The scheduling time interval depends on the resource limitation condition and on the estimated amount of frequency resources.

The arrangement 1100 further comprises a transmitting unit 1110 that is connected to the scheduling unit 1108. The transmitting unit 1110 is adapted to transmit the data waiting to be transmitted on the estimated amount of frequency resources. A respective portion of the estimated amount of frequency resources is used for transmitting a respective portion of the data waiting to be transmitted in each scheduling occasion over which the scheduling time interval extends.

According to some embodiments the arrangement 1100 may further comprise an activation unit 1112 adapted to activate application of the resource limitation condition. The activation unit may be controlled by other functions in the first network entity not located within the arrangement 1100. For example an ICIC function in the first network radio entity may control when to apply the method for improving predictability of interference in the first network radio entity. In this embodiment the resource limitation condition may for example be applied to the scheduling of data for transmission when the first network radio entity has received an indication that at least one neighboring network radio entity 102, 114 is experiencing interference from said first network radio entity. Connections between the activation unit 1112 and the units 1104-1108 are illustrated by a dashed arrow.

In FIG. 11 is also illustrated a computer program product 1116 which comprises instructions 1118, which when executed by a processor 1114 or similar, will cause the units 1102-1110 and optionally 1112, respectively, to perform their tasks according to an embodiment of the described procedure. Connections between the processor 1114 and the units 1102-1112 are illustrated by a dashed arrow.

Figure 10:
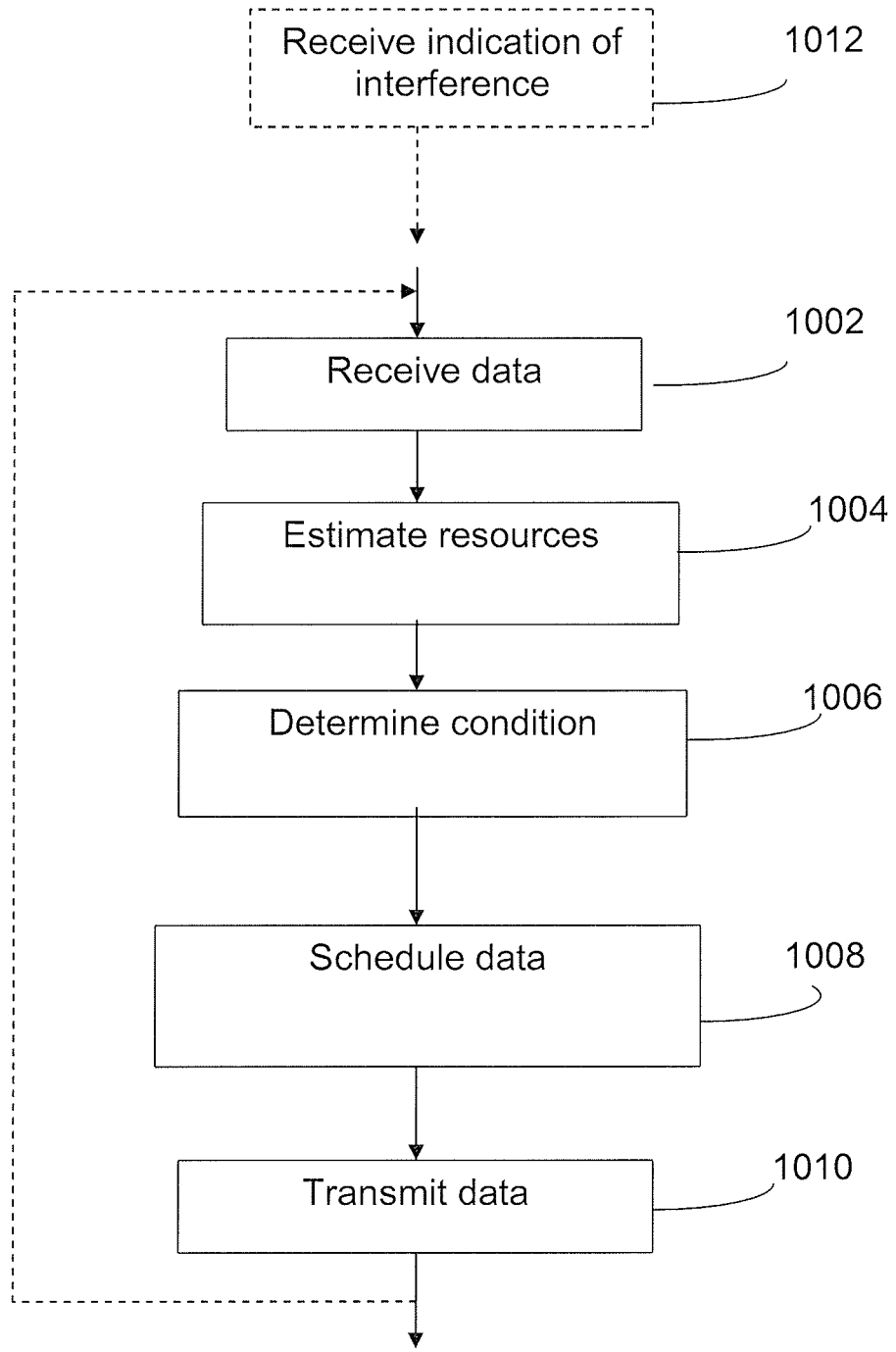
FIG. 10 is a flowchart illustrating a method for radio transmission according to one exemplary embodiment.

It should be noted that FIGS. 3, 8-9 and 11 merely illustrate various functional units in the network radio entities 300, 800, 900 and 1100 in a logical sense. However, the skilled person is free to implement these functions in practice using any suitable software and/or hardware means. Thus, the invention is generally not limited to the shown structure of the network radio entities 300, 800, 900 and 1100. The procedure steps illustrated in FIGS. 2, 6 and 10 are also illustrated in a logical sense.

An advantage of the invention is that it enables an improved prediction of inter-cell interference, and thereby improves the throughput and efficiency in a wireless communication system. A further advantage is that the result of ICIC may be improved, since there will be, at least during low to medium traffic loads, frequency bands, which are deliberately left unused by network radio entities that employ embodiments of the claimed invention, the frequency bands thereby being substantially free from inter-cell interference.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. Although the description has mainly been exemplified in terms of LTE, the scope of the invention is not limited hereto, but could also be applied in other similar systems, such as e.g. WiMAX. The invention is generally defined by the following independent claims.

The invention claimed is:

1. A method in a first network radio entity for improving predictability of inter-cell interference in a wireless communication system, which first network radio entity is located in a first cell, wherein the prediction of the interference is made prior to transmission of data by at least one neighboring network radio entity located in a neighboring cell, the interference being generated by transmission of data from the first network radio entity to one or more receiving network radio entities located in said first cell, the method comprising:
   receiving an amount of data to be transmitted;
   estimating an amount of frequency resources needed to transmit data waiting to be transmitted, including the received amount of data;
   determining a resource limitation condition based on the estimated amount of frequency resources and at least one time limit, wherein said resource limitation condition prolongs a time needed to transmit the data waiting to be transmitted by at least one transmission time interval as compared to the time needed to transmit the data waiting to be transmitted using a maximum amount of frequency resources available per scheduling occasion;
   scheduling the data waiting to be transmitted while applying the resource limitation condition, so that the data waiting to be transmitted is scheduled for transmission in scheduling occasions within a scheduling time interval that extends over at least two scheduling occasions, the scheduling time interval depending on the resource limitation condition and on the estimated amount of frequency resources; and
   transmitting the data waiting to be transmitted on the estimated amount of frequency resources so that a respective portion of the estimated amount of frequency resources is used for transmitting a respective portion of the data waiting to be transmitted in each scheduling occasion over which the scheduling time interval extends.

2. The method of claim 1, wherein the resource limitation condition is specified such that, for at least some of the scheduling occasions over which the scheduling time interval extends, the respective portion of the estimated amount of frequency resources used in the respective scheduling occasion is less than the maximum amount of frequency resources available per scheduling occasion.

3. The method of claim 1, wherein the resource limitation condition specifies a maximum amount of data to be scheduled at each scheduling occasion.

4. The method of claim 1, wherein the resource limitation condition specifies a reduced amount of frequency resources available at one scheduling occasion, as compared to the maximum amount of frequency resources available per scheduling occasion.

5. The method of claim 1, wherein the resource limitation condition specifies a period in time to be used as said scheduling time interval.

6. The method of claim 1, wherein the step of determining the resource limitation condition further comprises taking at least one of the following parameters into account:
   an earlier determined time interval that is to be applied as said scheduling time interval;
   a respective delay budget of packets comprising the data waiting to be transmitted;
   the estimated amount of frequency resources needed to transmit the data waiting to be transmitted;
   current and estimated/predicted future channel coding and modulation schemes;
   a respective priority of said packets comprising the data waiting to be transmitted; and
   a rate of arrival of bursts of packets comprising new data to be transmitted.

7. The method of claim 1, further comprising triggering an update of the resource limitation condition when a criterion is fulfilled.

8. The method of claim 7, wherein the criterion is fulfilled when the estimated amount of frequency resources needed to transmit the data waiting to be transmitted changes significantly.

9. The method of claim 7, wherein the criterion is fulfilled when one or more of the following conditions apply:
   new data to be transmitted is received;
   a predetermined time has elapsed since last update;
   the rate of arrival of new data to be transmitted has changed significantly;
   a certain change of radio conditions occurs;
   the coding and/or modulation scheme is changed;
   a change of available frequency resources occurs.

10. The method of claim 1, wherein the step of scheduling the data waiting to be transmitted further comprises deliberately delaying at least some of the data waiting to be transmitted before transmitting the at least some of the data waiting to be transmitted within said scheduling time interval.

11. The method of claim 1, wherein the step of scheduling the data waiting to be transmitted further comprises selecting the scheduling time interval so that the scheduling time interval is shorter than a respective delay budget of packets comprising the data waiting to be transmitted and so that said resource limitation condition is fulfilled.

12. The method of claim 11, wherein the respective delay budget of each of said packets comprising the data waiting to be transmitted defines a respective maximum allowable delay time for each of said packets comprising the data waiting to be transmitted.

13. The method of claim 1, the method further comprising receiving an indication that at least one neighboring network radio entity is experiencing interference from said first network radio entity.

14. An apparatus in a first network radio entity adapted to improve predictability of inter-cell interference in a wireless communication system, which first network radio entity is located in a first cell, wherein the prediction of the interference is made prior to transmission of data by at least one neighboring network radio entity located in a neighboring cell, the interference being generated by transmission of data from the first network radio entity to one or more receiving network radio entities located in said first cell, the apparatus comprising a processor circuit and a memory comprising instructions that, when executed by the processor circuit, cause the apparatus to comprise:
   a receiving unit configured to receive an amount of data to be transmitted;
   a resource unit connected to said receiving unit, which resource unit is configured to estimate an amount of frequency resources needed to transmit data waiting to be transmitted, including the received amount of data;
   a determining unit connected to said receiving unit and to said resource unit, which determining unit is configured to determine a resource limitation condition based on the estimated amount of frequency resources and at least one time limit, that prolongs a time needed to transmit the data waiting to be transmitted by at least one transmission time interval as compared to the time needed to transmit the data waiting to be transmitted using a maximum amount of frequency resources available per scheduling occasion;
   a scheduling unit connected to said determining unit and to said resource unit, which scheduling unit is configured to schedule the data waiting to be transmitted while applying the resource limitation condition, so that the data waiting to be transmitted is scheduled for transmission in scheduling occasions within a scheduling time interval that extends over at least two scheduling occasions, the scheduling time interval depending on the resource limitation condition and on the estimated amount of frequency resources; and
   a transmitting unit connected to said scheduling unit, which transmitting unit is configured to transmit the data waiting to be transmitted on the estimated amount of frequency resources so that a respective portion of the estimated amount of frequency resources is used for transmitting a respective portion of the data waiting to be transmitted in each scheduling occasion over which the scheduling time interval extends.

15. The apparatus of claim 14, wherein the resource limitation condition is specified such that, for at least some of the scheduling occasions over which the scheduling time interval extends, the respective portion of the estimated amount of frequency resources used in the respective scheduling occasion is less than the maximum amount of frequency resources available per scheduling occasion.

16. The apparatus of claim 14, wherein the first network radio entity is a base station and the one or more receiving network radio entities are mobile terminals.

17. The apparatus of claim 14, wherein the memory further comprises instructions that, when executed by the processor circuit, cause the apparatus to comprise an activation unit configured to activate application of said resource limitation condition when the first network radio entity has received an indication that at least one neighboring network radio entity is experiencing interference from said first network radio entity.

18. The apparatus of claim 17, wherein said indication is received by said first network radio entity over an X2 interface.

19. The apparatus of claim 18, wherein said indication is received in one of a Relative Narrowband Transmit Power (RNTP) message or a High Interference Indicator (HII) message or an Overload Indication (OI) message.

* * * * *